A. FAESSEL.
AUTOMATIC NUT APPLYING DEVICE.
APPLICATION FILED JAN. 31, 1920.

1,390,351.

Patented Sept. 13, 1921.
3 SHEETS—SHEET 1.

Witnesses:
GBurkhardt

Inventor:
Albert Faessel,
By Wilkinson, Huxley, Byron + Knight
Attys.

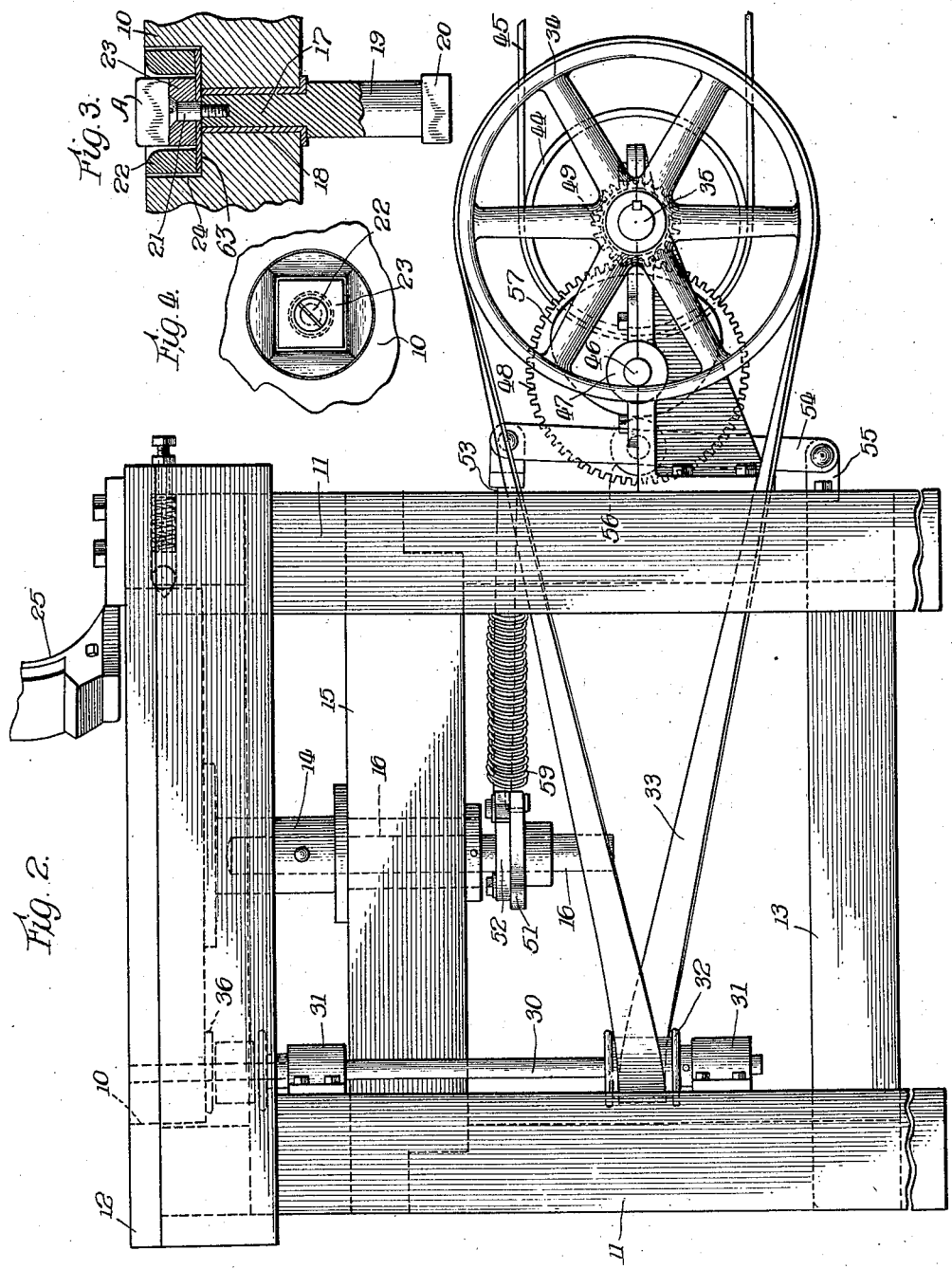

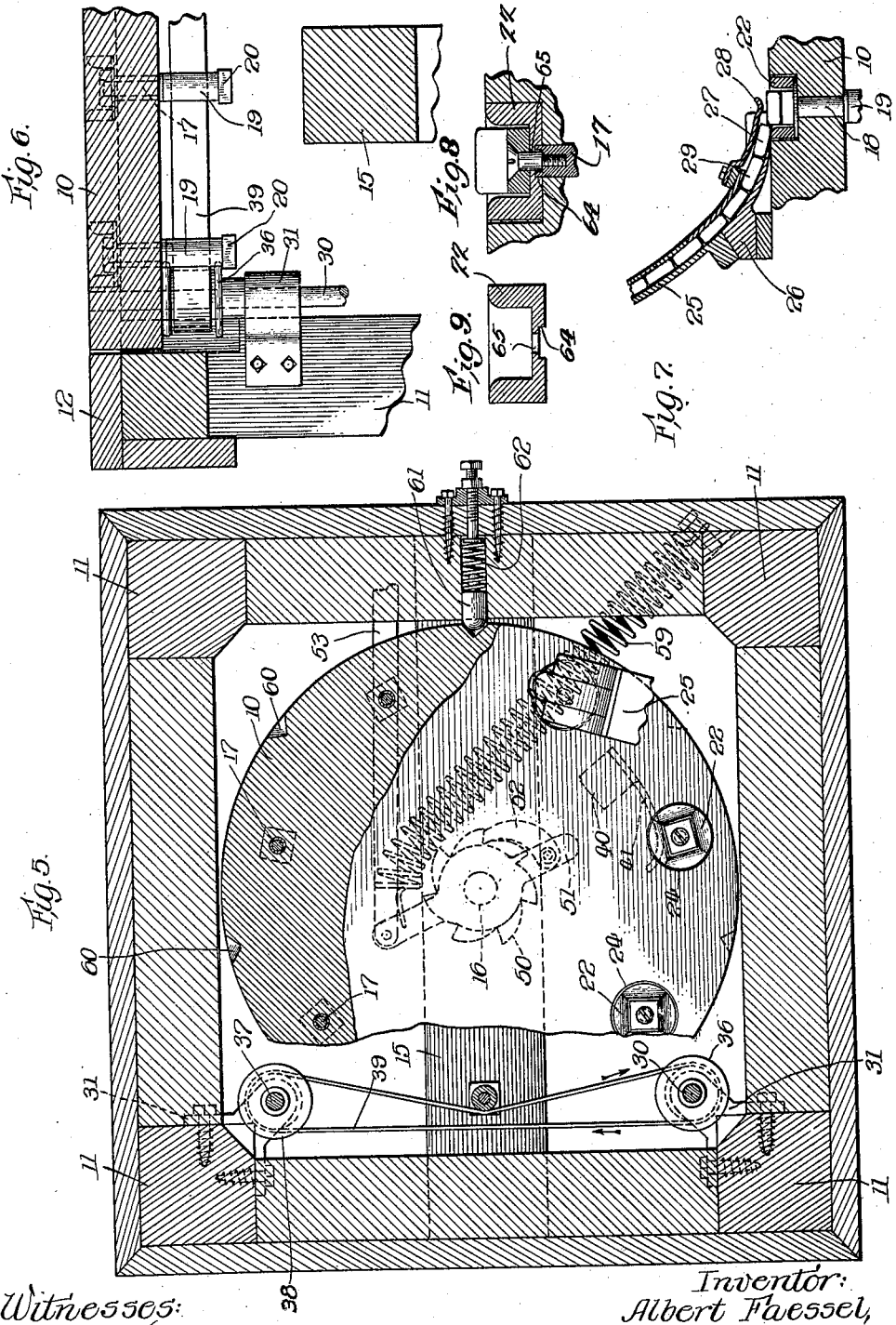

UNITED STATES PATENT OFFICE.

ALBERT FAESSEL, OF CHICAGO, ILLINOIS, ASSIGNOR TO CONTINENTAL BOLT & IRON WORKS, OF CHICAGO, ILLINOIS, A CORPORATION OF ILLINOIS.

AUTOMATIC NUT-APPLYING DEVICE.

1,390,351.  Specification of Letters Patent.  Patented Sept. 13, 1921.

Application filed January 31, 1920. Serial No. 355,433.

*To all whom it may concern:*

Be it known that I, ALBERT FAESSEL, a citizen of the United States, residing at Chicago, in the county of Cook and State of Illinois, have invented certain new and useful Improvements in Automatic Nut-Applying Devices, of which the following is a specification.

My invention relates to automatic machinery, and especially to a machine for applying nuts to bolts at the place of manufacture, thereby eliminating the manual application of nuts to bolts.

In the manufacture of nuts and bolts, where the nuts and bolts are shipped in kegs and like containers, no satisfactory means have been devised for applying the nuts to the bolts. For the most part the nuts are applied manually, which necessarily limits the output of the manufacturer to the number of bolts to which nuts can be applied manually during a day or other fixed period of time. I am aware that semi-automatic machines have been devised, but I am not aware that any machine has been devised which applies nuts to bolts in such manner as not to make the human element a large factor in controlling the application of nuts to bolts.

An object of my invention is to provide an automatic machine for applying nuts to bolts in such manner as to reduce the human element to a minimum.

Another object of my invention is to provide a machine for automatically applying nuts to bolts by spinning the nuts, and in which the only manual operation necessary is the application of the threaded end of a bolt to a nut which is being spun, and the provision of means for automatically feeding the nuts to the spinning means.

A further object is to provide a machine of such nature as to present a single nut for application to a bolt, the nut having been delivered automatically in such manner as to present it to the bolt, and the provision of means to screw the nut onto the bolt.

A yet further object is to provide an automatic machine for feeding nuts in such manner that the same may be applied to bolts.

A still further object is the improvement of automatic machines for applying nuts to bolts for successful commercial use.

Generally speaking, I accomplish the objects of my invention by providing a rotating table or turn-table and mounting therein a plurality of vertically disposed spindles, the upper ends of which are preferably flush with the upper surface of the table, and which ends are shaped to receive nuts of the particular size and shape desired. I further provide means for feeding the nuts in such manner as to deposit a single nut in every one of the spindles, then moving the table in a step-by-step movement and at a certain point in the travel thereof spinning the spindles in such direction that the threaded end of a bolt when applied to a nut in said spinning spindle will have the nut screwed thereon.

I attain the objects of my invention in the manner illustrated in the accompanying drawings and described and claimed herein.

In the drawings,—

Fig. 2 is a side elevational view of Fig. 1;

Fig. 3 is an enlarged sectional view of one of the spindles of my invention;

Fig. 4 is a plan view of Fig. 3;

Fig. 5 is a plan view partially in section showing details of construction, and particularly the position occupied by a spindle while being spun by the belt 39;

Fig. 6 is a vertical view partially in section showing the preferred means for spinning the spindles; and Fig. 7 is a vertical sectional view of means for feeding nuts to the spindles.

Fig. 8 is a transverse vertical section through the nut receiving device; and

Fig. 9 is a vertical transverse section of the nut receiving cup showing details of construction.

Figure 1:
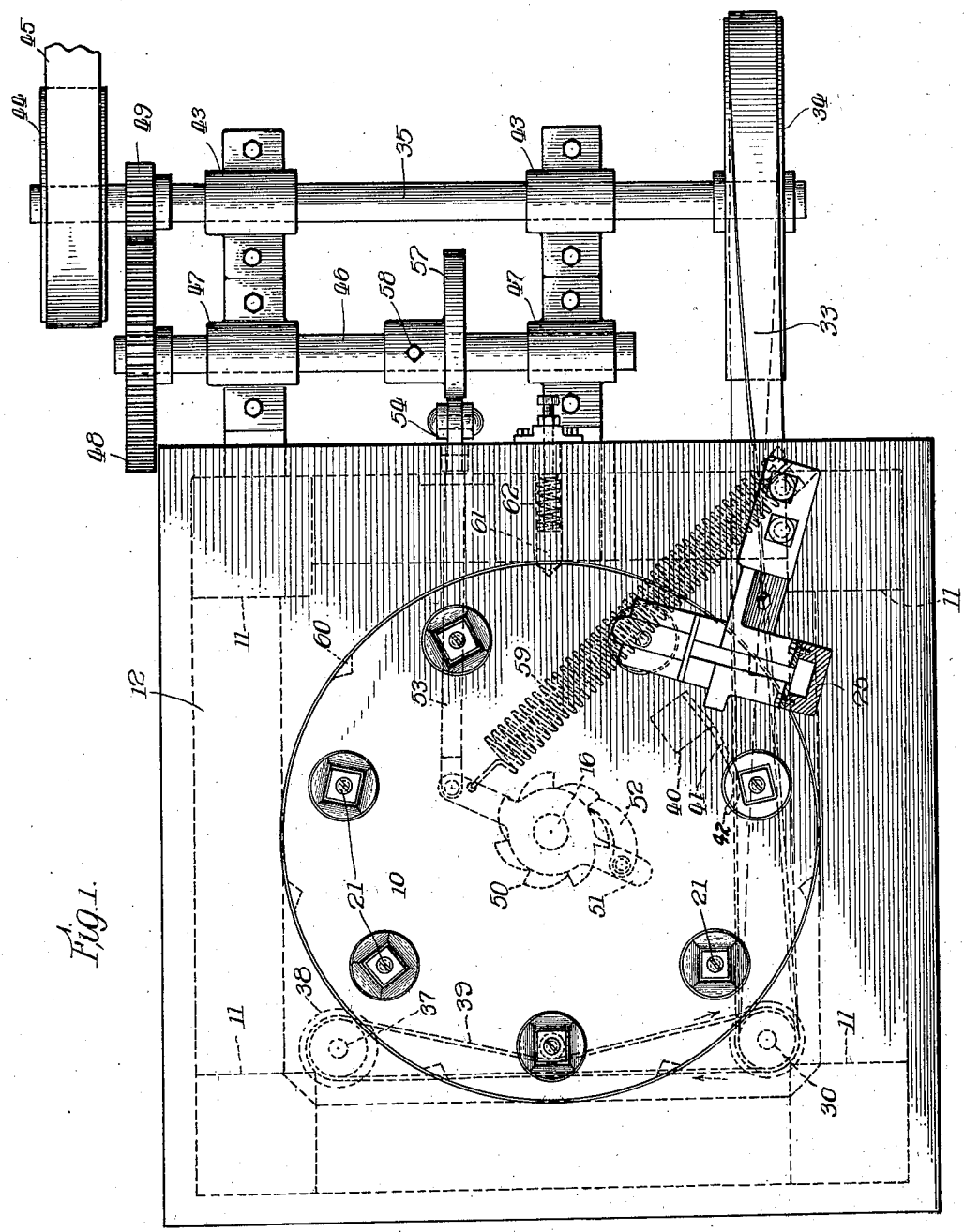
Figure 1 is a top plan view of the preferred embodiment of my invention.

In the drawings I provide a turn table 10 which is carried in a bench or table having supports 11, a top 12 which is provided with an aperture of a size and shape to receive the turn table 10. Cross braces 13 connect the legs 11 as a means for affording additional strength to the supports. The turn table 10 is carried on a central bearing 14 mounted on cross braces 15 of the framework of the apparatus and is rotated by a vertical shaft 16, the rotation being preferably step-by-step and accomplished by means to be hereinafter described. Mounted at suitable distances in the turn table, preferably near the periphery thereof, are spindles for receiving single nuts. Referring to Fig.

3, a spindle includes a cylindrical portion 17 carried in a bushing 18 suitably secured in the turn table 10. Below the turn table 10 the portion 17 is enlarged at 19 and below that is a square or polygonal head 20. Mounted on the end of the reduced portion 17 by a screw 21 or other suitable securing means is a cup-shaped member 22, the size and shape of this cup member being such that a single nut A is received in the cup and prevented from rotation with respect thereto. In the drawings the nut A is shown as a square nut. To accommodate the difference in thickness of the various nuts which may be fed to the machine of my invention, I interpose a filler 23 which is secured in position by the screw 21, although it may be found desirable to have made cups of various shapes and sizes to be readily applicable to the spindles to receive the many and various types of nuts a manufacturer might make. The cup 22 is preferably slightly smaller in diameter than the opening 24 in the upper surface of the turn table 10. It is of course understood that my apparatus is susceptible of changes in form, proportion of parts and the like so that any size or shape of nut may be accommodated.

Referring to Fig. 7, I have shown therein one form of means for feeding nuts to the spindles. This form consists of a chute 25 suitably mounted by means of a support 26 on the top of the table or apparatus of my invention. The chute is connected with a hopper (not shown) wherein the nuts are placed and from which the same are fed in a row as shown in Fig. 7 for delivery to the spindles of my invention. The chute is so arranged that the lowermost nut indicated at 27 in Fig. 7 will be engaged by the edge of the cup 22 of the spindle, as the same is moved into position at the foot of the chute. The spring 28 coöperates with the end of the chute for guiding the nut into the cup of the spindle and at the same time serves to prevent the next nut 29 from being delivered to the cup 22. The details of the nut receiving device are more clearly shown in Figs. 8 and 9 of the drawings. In this construction the upper end of the spindle 17 is slotted at 65 to receive a horizontally disposed key 63, which key interfits in a groove 64 in the underside of the cup 22 for the purpose of rotating the cup with the spindle 17. The cup 22 is provided with an aperture 65 for the passage of a screw or similar member 21 so that the cup and key may be suitably secured to the spindle for rotation therewith.

For spinning the spindles whereby the nut contained therein may be applied to a bolt, I provide at the rear of the table a vertical shaft 30 carried in suitable bearings 31 in the frame of the apparatus. Near the lower end of the shaft a pulley 32 is affixed with which coöperates a belt 33 driven by a pulley 34 on shaft 35 suitably supported in the apparatus. The upper end of this shaft 30 is provided with a pulley 36. At the opposite rear corner of the machine another vertical shaft 37 is mounted which is similar to shaft 30 and is carried in similar bearings 31. The upper end of this shaft is provided with a pulley 38 and between pulleys 36 and 38 is stretched a belt 39. Preferably the belt is slack, but not slack enough to leave the pulleys 36 and 38 as the shafts are being turned. The position of the belt 39 is such as to engage the enlarged cylindrical portions 19 of the nut spindles as the same are moved by rotation of the turn table. It will therefore be apparent that as the several spindles are moved into contact with the belt 39, they will be rotated at a speed dependent on the speed of the belt 39. Consequently, the nut which is contained in the cup of the particular spindle being rotated will be turned and a bolt applied to said nut will have the nut screwed thereon.

It is an important feature of my invention that the nut receiving cup 22 be guided into such a position that when the nut 27 is fed thereto by the feeding device the cup will be in position to receive the nut. The form which I have shown in the drawings for guiding the spindles into nut receiving position includes a bracket 40 secured to the under side of the framework and which bracket has a rearwardly extending arm 41, the free end 42 of which arm is bent outwardly or toward the axis of the turn table, the bracket and its attached arm being positioned to engage the heads 20 of the nut spindles and to move and maintain the same in proper angular position to receive a nut from the nut feeding device.

For imparting continuous movement to the various parts of my invention I have shown a shafting arrangement comprising shaft 35 carried in suitable supports 43 mounted on the framework of the machine. At one end of the support 43 a pulley 34 is keyed, while at the other end of said shaft is keyed a pulley 44 which pulley is connected by a belt 45 to a source of power. Between the shaft 35 and the frame of the machine is a second shaft 46 carried in bearings 47 and which shaft is connected for rotation with the shaft 35 by means of geared pinions 48 and 49, the pinions being of such size as to drive the shaft 46 at a predetermined relative speed with respect to shaft 35. As before stated, the pulley 34 is connected by a belt 33 to the vertical shaft 30 for the purpose of spinning the nut spindles.

For imparting step-by-step rotation to the turn table 10, I mount on the vertical shaft 16 a toothed member 50 below which is pivoted an arm 51 on the shaft 16. The arm 51 is provided with a pawl 52 adapted to engage the member 50. For turning the arm 51 whereby the pawl is caused to engage successive teeth of the member 51, the opposite end of the arm 51 is connected by a link 53 to the upper end of a vertical movable rocker arm 54, which rocker is secured at its lower end by means of a bracket 55 to the framework of the apparatus. At a suitable point in the length of the arm 55 there is provided a roller 56 and on the shaft 46 a cam 57 is secured by means of a set screw 58 or other suitable means for contacting the roller 56 in the arm 54. To retain the arm 51 in retracted position, that is, the position shown in Fig. 1 of the drawing, and always in contact with the cam 57, a spring 59 is connected at one end to the arm 51 on the same side that the link 53 is connected, and at the other end is connected to the framework of the apparatus in any desirable manner. It will therefore be apparent that as the shafts 35 and 46 rotate the cam 57 will impart reciprocatory motion to the link 53. This in turn will cause the pawl 52 to move the member 50 and the fixed shaft 16 carrying the turn table 10 in step-by-step movement, the amount of movement being dependent on the arrangement of the teeth of the member 50 and the cam 57. The spring 59 acts to maintain the roller 56 in contact always with the cam 57. As a means for holding the turn table 10 in the position to which such member has been turned by the intermittent driving mechanism before described, I form on the edges of the table a series of recesses 60 and in the framework of the machine I position a pawl or other member 61 which is maintained normally outwardly by means of a spring 62, the arrangement being such that as the turn table 10 is moved the pawl 61 will engage the particular recess opposite the position of the pawl and therefore hold the turn table against rotative movement until acted on by the proper mechanism to move the same another step or notch.

It is believed that the operation of my invention is clear. However, I shall describe the operation thereof again.

The apparatus having been put in motion by means of the application of power through belt 45 to the pulley 44, the various parts are caused to move as above described. As soon as the power is applied, the turn table will be moved in step-by-step movement, the spinning belt 39 caused to move and also the various parts of the apparatus to function. The nuts now being applied to the hopper are fed in a single column through the feeding mechanism as shown in Fig. 7, and discharged one by one into the cups 22 of the successive spindles, the turn table being stopped in such position that a cup 22 is ready to receive a nut. The nut being properly delivered to the cup, the mechanism causes the turn table to move a sufficient distance to bring the next following spindle into position to receive a nut. Eventually the spindles carrying the nuts are rotated by a belt 39 and the attendant may apply the threaded end of a bolt to the nut in the spindle being rotated and have the nut screwed thereon. The apparatus is so arranged that the feeding of the nuts may be regulated as to speed, and therefore the output of the apparatus depends largely on the speed with which the attendant may apply bolts to the nuts being spun in the particular spindles. After the nuts have been removed the spindles are then moved into nut-receiving position and maintained in this position by reason of engagement with the bracket 40 and the attached arm 41, all of which is clear from the drawings.

It will be noted that my invention is of such nature that the only manual operation necessary is the application of a bolt to a spinning nut. This therefore eliminates all chances of injury to the attendant and it facilitates the application of nuts to bolts many fold, as it is but a simple matter for an attendant to apply bolts to the nuts being spun, and it is work which unskilled labor may successfully perform.

I have found in practice that my invention increases the output many times and eliminates all possibility of danger to the operator, and makes impossible the intervention of the human element to hamper the operation of the apparatus.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. In an apparatus of the class described, including means for receiving individual nuts, means for spinning said receiving means at a point remote from the nut receiving position, means for moving said receiving means from receiving position to spinning position, and means for feeding the nuts.

2. In a device of the class described, including in combination, a turn table, a nut-receiving spindle therein, means for feeding nuts to said spindle, means for turning said table, and means for spinning said spindle at a point remote from the nut feeding position.

3. In a device of the class described, including in combination, a turn table, a plurality of nut-receiving spindles carried thereby, means for imparting step-by-step movement to said table, means for feeding nuts to said spindles, and means for spinning certain of said spindles.

4. In a device of the class described, including in combination, a turn table, a plurality of nut-receiving spindles carried thereby, means for imparting step-by-step movement to said table, means for feeding nuts to said spindles, means for spinning certain of said spindles, and means for turning said spindles into nut-receiving position.

5. In a device of the class described, including in combination, a turn table, a plurality of nut-receiving spindles carried thereby, means for imparting step-by-step movement to said table, means for feeding nuts to said spindles, means for spinning certain of said spindles, and means for guiding said spindles into nut-receiving position.

6. In a device of the class described, including in combination, a turn table, a plurality of nut-receiving spindles carried thereby, means for imparting step-by-step movement to said table, means for feeding nuts to said spindles, and means for rotating said spindles, said means including a belt adapted to engage said spindles at certain positions in the travel of the table.

7. In a device of the class described, including in combination, a turn table, a plurality of nut-receiving spindles carried thereby, means for imparting step-by-step movement to said table, means for feeding nuts to said spindles, said spindles having a cylindrical portion, and means for spinning certain of said spindles including a horizontally disposed belt adapted to engage said cylindrical portion of said spindles for rotating the same at a point of engagement distant from the nut-receiving position of said spindles.

8. In a device of the class described, including in combination, a turn table, a plurality of nut-receiving spindles carried thereby, means for imparting step-by-step movement to said table, means for feeding nuts to said spindles, said spindles having a cylindrical portion, means for spinning certain of said spindles including a horizontally disposed belt adapted to engage said cylindrical portion of said spindles for rotating the same at a point of engagement distant from the nut-receiving position of said spindles, and means for guiding said spindles into nut-receiving position after leaving the spinning position.

9. A nut-applying machine including a turn table, a plurality of rotatably mounted vertically disposed spindles carried therein, every spindle being provided with a single nut-receiving cup, means for feeding nuts to said cups, means for imparting step-by-step movement to said table to successively position said cups at said feeding means, means remote from said feeding position for rotating said spindles, means for guiding said spindles into nut-receiving position after leaving said spinning position, and means for causing said several means to function.

10. In a device of the class described, including a rotating table, a plurality of vertically disposed spindles therein, a cup for receiving a nut in the upper end of said spindles flush with the table, means for feeding nuts to said cups whereby a single nut may be deposited in a cup, means for imparting step-by-step rotation to said table whereby said cups are presented successively to the nut feeding means, and means for rotating one of said spindles during the interval the table is at rest, and means for guiding the spindle about to receive a nut into position to receive said nut.

11. In a device of the class described, in combination, a bodily movable and rotatable cup adapted to receive a nut, means for feeding nuts to said cup, means for spinning said cup, and means for supporting said cup in feeding and spinning positions.

12. In a device of the class described, in combination, a bodily movable and rotatable cup adapted to receive a nut, means for feeding nuts to said cup, means for spinning said cup, means for supporting said cup in feeding and spinning positions, and means for moving said cup from feeding to spinning position.

13. In a device of the class described, in combination, means for feeding nuts singly, means for receiving a nut from said feeding means, means for horizontally moving said receiving means from nut receiving position, and means for spinning said nut receiving means in the latter position.

Signed at Chicago, Illinois, this 26 day of January, 1920.

ALBERT FAESSEL.